Patented Feb. 17, 1953

2,628,956

UNITED STATES PATENT OFFICE 2,628,956

SYNTHETIC RUBBER EMULSION POLYMERIZATIONS AT SUBFREEZING TEMPERATURES

Robert W. Brown, Naugatuck, Conn., assignor to United States Rubber Company, New York, N. Y., a corporation of New Jersey No Drawing. Application March 15, 1951, Serial No. 215,872

6 Claims. (Cl. 260—84.7)

This invention relates to improvements in aqueous synthetic rubber emulsion polymerizations at sub-freezing temperatures.

Attempts have been made to use ammonia as an anti-freeze in conventional aqueous emulsion polymerizations of mixtures of butadiene-1,3 and styrene (GR–S) polymerizations without success. This is not surprising in view of the known fact that ammonia strongly inhibits polymerization of conventional peroxide catalyzed GR–S recipes. Ammonia, however, would be an excellent antifreeze as compared with alcohols, glycols and glycerine, since the freezing point of a 10% ammonia solution is −13° C., as compared with −6.5° C. for 10% methanol, −4.5° C. for 10% ethanol, and −3.5° C. for 10% ethylene glycol, and −2° C. for 10% glycerine. In fact, ammonia has the advantage of a very low melting eutectic mixture with water, temperatures of −120° C. being attainable with 35% aqueous ammonia. Ammonia also would have the further advantage of being easily removable and recoverable from polymerized latex, which some antifreezes, notably glycerine and glycols, are not. Also, the high solubility of ammonia in water relative to the monomers commonly used, makes it easy to separate from recovered monomers, and it also insures its remaining in the aqueous phase during polymerization.

I have discovered that ammonia can be used as an antifreeze in certain aqueous synthetic rubber polymerizations at freezing temperatures, from below 0° C. to −100° C., if the polymerization takes place in a polyalkylene polyamine activated organic peroxide catalyst system (so-called peroxyamine polymerization).

In carrying out the present invention, the synthetic rubber-producing polymerizable monomers are polymerized in aqueous emulsion in the presence of an organic peroxide catalyst, a polyethylene polyamine activator, and sufficient free ammonia to reduce the freezing point of the aqueous polymerization medium to below the normally freezing temperature at which polymerization is made to take place. Generally, the ammonia concentration of the aqueous polymerization medium will be from 5 to 35%, which will prevent freezing at normally freezing temperatures of below 0° C. to −100° C., or lower, depending on the concentration of ammonia in the ammoniacal aqueous polymerization medium. All percentages and parts referred to herein are by weight. The polymerization is allowed to continue until the desired conversion of monomers to synthetic rubber, generally 45 to 95% conversion, is reached. After conversion of the desired amount of polymerizable monomers to synthetic rubber, the polymerization is stopped by the addition of a so-called shortstopping agent (e. g. di-tert.butyl hydroquinone, dinitro chlorobenzene, sodium dimethyl dithiocarbamate, dimethylammonium dimethyl dithiocarbamate) and the residual polymerizable monomers are removed from the synthetic rubber latex. Those which are gaseous at atmospheric pressure and at the temperature of polymerization or the temperature to which the synthetic rubber latex is allowed to rise after polymerization, may be vented off. Residual higher boiling or liquid monomers at room temperature are removed by steam distilling under reduced pressure. If desired, the synthetic rubber latex may be coagulated by salt and/or acid in known manner.

The catalyst is a conventional organic hydroperoxide catalyst, for example, cumene hydroperoxide, dodecyl cumene hydroperoxide, chlorocumene hydroperoxide, tert.butyl cumene hydroperoxide, di-isopropyl benzene hydroperoxide, triisopropyl benzene hydroperoxide, tert.amyl hydroperoxide, cyclohexyl benzene hydroperoxide, menthane hydroperoxide. The amount of organic peroxide catalyst will generally be from 0.05 to 2 parts per 100 parts by polymerizable monomers. All parts and percentages referred to herein are by weight.

The polyalkylene polyamine activators for the organic peroxide catalyst are well known materials and may be one or a mixture of polyalkylene polyamines. Effective activators are diethylene triamine, dipropylene triamine, triethylene tetramine, tripropylene tetramine, tetraethylene pentamine, pentaethylene hexamine, hexaethylene heptamine, heptaethylene octamine, and higher polyethylene polyamines up to mixtures of high molecular weight polyethylene polyamines having an average molecular weight of over a thousand, as in the still bottom from the distillation recovery of the lower polyethylene polyamines (and ethylene diamine) from the autoclave reaction product of ethylene dichloride and ammonia, which has a molecular weight around 1200. The amount of polyalkylene polyamine will generally be from 0.05 to 1 part per 100 parts of polymerizable monomers.

The emulsifying agent may be the conventional soaps, such as the alkali (alkali-metal, ammonium or amine) soaps of soap-forming monocarboxylic acids having 10 to 20 carbon atoms in the molecule, viz, higher fatty acids or of rosin acids (abietic, hydroabietic, and/or dehydroabietic acids), or mixtures of the same. The emulsifying agent may, if desired, be a conventional sulfated or sulfonated surface-active agent containing an organic radical having 8 to 20 carbon atoms, or the emulsifying agent may be a mixture of such soaps and sulfated or sulfonated surface-active agents. The amount of emulsifying agent generally will be 1 to 8 parts per 100 of polymerizable monomers.

The polymerizable material in the preparation of the synthetic rubber latex may be one or a mixture of butadienes-1,3 hydrocarbons, for example, butadiene-1,3 methyl-2-butadiene-1,3 (isoprene), piperylene, 2,3-dimethyl butadiene-1,3, or may be a mixture of one or more such butadiene-1,3 hydrocarbons with up to 70% by weight of the mixture of one or more aryl olefins, e. g. styrene, vinyl naphthylene, alpha methyl styrene, parachloro styrene, dichloro styrenes.

The following is illustrative of the present invention:

The following recipe was loaded into a series of twelve polymerization bottles:

|  | Parts |
|---|---|
| Butadiene-1,3 | 71 |
| Styrene | 29 |
| Tetraethylene pentamine | 0.30 |
| Tetrasodium salt of ethylene diamine tetraacetic acid | 0.03 |
| Ferric chloride hexahydrate | 0.01 |
| Oleic acid | 5.0 |
| Potassium hydroxide | 0.6 |
| Dodecyl mercaptan | 0.15 |
| Aqueous ammonium hydroxide (28% NH₃) | 110 |
| Water | 90 |

Tetrasodium salt of ethylene diamine tetraacetic acid was added to control the initial reaction rate and sustain polymerization. The ferric chloride hexahydrate was added to increase the rate of polymerization. Dodecyl mercaptan was a conventional polymerization regulator.

The loaded bottles were shaken to emulsify the charge, cooled to −18° C., shaken again and 0.25 part of diisopropyl benzene hydroperoxide injected through a self-sealing gasket in the cap. They were then rotated end over end in a constant temperature bath at −18° C. for 25 hours. Polymerization was stopped by addition of 0.2 part of dimethylammonium dimethyl dithiocarbamate. The bottles were opened and the excess butadiene vented. The latices were blended together and steam stripped to remove excess styrene and ammonia. After stripping, the pH of the latex was about 7. Two percent potassium hydroxide was added to raise the pH to 9.5 The latex was coagulated by addition of salt and dilute sulfuric acid. After drying, 62.5% conversion of monomer to a satisfactory synthetic rubber was obtained.

In view of the many changes and modifications that may be made without departing from the principles underlying the invention reference should be made to the appended claims for an understanding of the scope of the protection afforded the invention.

Having thus described my invention, what I claim and desire to protect by Letters Patent is:

1. The process which comprises polymerizing at normally freezing temperatures from below 0° C. to −100° C., an aqueous emulsion of polymerizable synthetic rubber monomers selected from the group consisting of butadiene-1,3 hydrocarbons and mixtures of butadiene-1,3 hydrocarbons with aryl olefines, containing emulsifying agent, organic hydroperoxide catalyst, and polyalkylene polyamine activator, said emulsion containing ammonia in amount to prevent freezing at the polymerization temperature, such amount being in the range of 5 to 50 parts of ammonia per 100 parts of water present.

2. The process which comprises polymerizing at normally freezing temperatures from below 0° C. to −100° C., an aqueous emulsion of a mixture of butadiene-1,3 and styrene containing emulsifying agent, organic hydroperoxide catalyst, and polyalkylene polyamine activator, said emulsion containing ammonia in amount to prevent freezing at the polymerization temperature, such amount being in the range of 5 to 50 parts of ammonia per 100 parts of water present.

3. The process which comprises polymerizing at normally freezing temperatures from below 0° C. to −100° C., an aqueous emulsion of a mixture of butadiene-1,3 and styrene containing emulsifying agent, organic hydroperoxide catalyst, and polyethylene polyamine activator, said emulsion containing ammonia in amount to prevent freezing at the polymerization temperature, such amount being in the range of 5 to 50 parts of ammonia per 100 parts of water present.

4. The process which comprises polymerizing at normally freezing temperatures from below 0° C. to −100° C., an aqueous emulsion of a mixture of butadiene-1,3 and styrene containing emulsifying agent, organic hydroperoxide catalyst, and tetraethylene pentamine activator, said emulsion containing ammonia in amount to prevent freezing at the polymerization temperature, such amount being in the range of 5 to 50 parts of ammonia per 100 parts of water present.

5. The process which comprises polymerizing at normally freezing temperatures from below 0° C. to −100° C., an aqueous emulsion of a mixture of butadiene-1,3 and styrene containing emulsifying agent, diisopropylbenzene hydroperoxide catalyst, and polyethylene polyamine activator, said emulsion containing ammonia in amount to prevent freezing at the polymerization temperature, such amount being in the range of 5 to 50 parts of ammonia per 100 parts of water present.

6. The process which comprises polymerizing at normally freezing temperatures from below 0° C. to −100° C., an aqueous emulsion of a mixture of butadiene-1,3 and styrene containing emulsifying agent, diisopropylbenzene hydroperoxide catalyst, and tetraethylene pentamine activator, said emulsion containing ammonia in amount to prevent freezing at the polymerization temperature, such amount being in the range of 5 to 50 parts of ammonia per 100 parts of water present.

ROBERT W. BROWN.

REFERENCES CITED

The following references are of record in the file of this patent:

Whitby et al., Ind. and Eng. Chem., vol. 42, No. 5, March 1950, pp. 445–456.